(12) United States Patent
Pleschiutschnigg

(10) Patent No.: US 6,264,723 B1
(45) Date of Patent: Jul. 24, 2001

(54) METHOD FOR MANUFACTURING STEEL

(75) Inventor: Fritz-Peter Pleschiutschnigg, Duisburg (DE)

(73) Assignee: SMS Schloemann-Siemag Aktiengesellschaft, Düsseldorf (DE)

(*) Notice: Subject to any disclaimer, the term of this patent is extended or adjusted under 35 U.S.C. 154(b) by 0 days.

(21) Appl. No.: 09/326,403

(22) Filed: Jun. 4, 1999

(30) Foreign Application Priority Data

Jun. 10, 1998 (DE) .............................. 198 25 937
Aug. 24, 1998 (DE) .............................. 198 38 330

(51) Int. Cl.[7] .............................. C21B 5/02; C21B 13/12
(52) U.S. Cl. .............................. 75/460; 75/471; 75/472; 75/10.42; 75/10.66; 164/266; 164/417; 164/476
(58) Field of Search .............................. 266/142, 197, 266/218; 75/10.41, 10.42, 10.6, 10.61, 10.66, 460, 472, 471; 164/266, 476, 417

(56) References Cited

U.S. PATENT DOCUMENTS

| | | | | |
|---|---|---|---|---|
| 1,691,401 | * | 11/1928 | Moldenke | 75/10.66 |
| 3,079,247 | * | 2/1963 | Durrer et al. | 75/10.61 |
| 3,218,155 | * | 11/1965 | Strassburger | 75/460 |
| 3,282,678 | * | 11/1966 | Melcher et al. | 75/463 |
| 3,610,315 | * | 10/1971 | Juergens et al. | 164/76 |
| 4,248,624 | * | 2/1981 | Novoa et al. | 75/472 |
| 4,362,556 | * | 12/1982 | Kishida | 75/10.61 |
| 4,421,555 | * | 12/1983 | Metz et al. | 75/532 |
| 4,696,458 | * | 9/1987 | Royzman | 266/212 |
| 4,822,411 | * | 4/1989 | Standler et al. | 266/142 |
| 4,844,737 | * | 7/1989 | Oono et al. | 75/460 |
| 4,909,303 | * | 3/1990 | Meierling | 164/418 |
| 4,917,727 | * | 4/1990 | Saito et al. | 75/460 |
| 5,286,277 | | 2/1994 | Aizatulov et al. | 75/523 |
| 5,602,867 | | 2/1997 | Hübers et al. | 373/78 |
| 5,634,257 | | 6/1997 | Kajiwara et al. | 29/527.7 |

OTHER PUBLICATIONS

Shvedov V.S., E.A. "Blast Furnace Operation on Metallized Pellets with Complete Elimination . . . ", Steel in the USSR. BD. 9, No. 9, Sep. 1979, pp 435–437.*

Derwent publication 101076 "Steel production in electric furnace supplied with hot metal—with a reduced melting cycle time to increase productivity." Nov. 25, 1999.*

Greis, Peter. "Stahlindustrie im Umbruch—Einige Technische Trends der Metec '94". Stahl und Eisen 114 (Aug. 1994) pp. 47–58.*

Kruger et al. "Saldanha Steel—die neue Minimill–Produktionslinie fur dunne Flacherzeugnisse hoher Qualitat". Stahl und Eisen 117 (Nov. 1997) pp. 81–93.*

Patent Abstracts of Japan, vol. 013, No. 560 (M–906), Dec. 13, 1989 & JP 01 233005 A (Sumitomo Metal Ind Ltd), Sep. 18, 1989.

* cited by examiner

Primary Examiner—Roy King
Assistant Examiner—Tima McGuthry-Banks
(74) Attorney, Agent, or Firm—Friedrich Kueffner

(57) ABSTRACT

A method and a plant for manufacturing steel in an electric steel furnace wherein the electric steel furnace is charged with at most 70% scrap and with at most 60% liquid pig iron obtained in a mini-blast furnace, and optionally with additional iron carriers, and wherein the mini-blast furnace is operated for producing the pig iron with iron pellets and/or coarse or lump ore and coke as well as coal. The melting process in the electric steel furnace is operated using electrical energy and by simultaneously using oxygen and injected coal. The plant for carrying out the method is composed of a mini-blast furnace and an electric steel furnace.

6 Claims, 1 Drawing Sheet

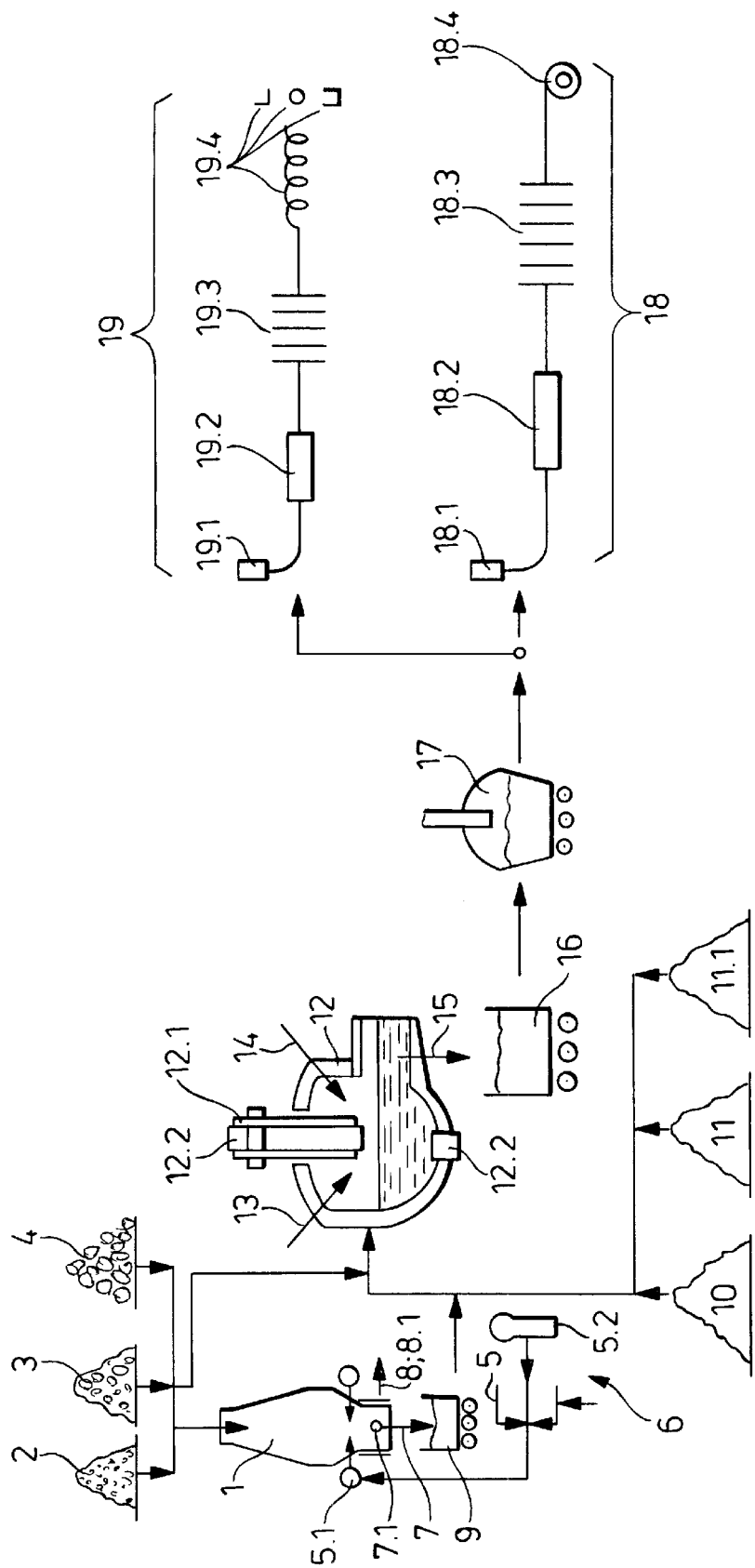

METHOD FOR MANUFACTURING STEEL

BACKGROUND OF THE INVENTION

1. Field of the Invention

The present invention relates to a method and a plant for manufacturing steel in an electric steel furnace.

2. Description of the Related Art

Several methods for producing steel are known in the art. Essentially two types of methods are used today, i.e., the manufacture of steel in accordance with the conventional blast furnace converter method, and the method using the electric steel furnace.

The electric steel furnace is usually charged with 80 to 100% scrap and small portions of sponge iron (reduced iron ore) from a direct reduction plant. The electric steel furnace is used as a melting vessel and the further metallurgical process takes place in a secondary metallurgical step.

It has been know since about 1980 to manufacture hot strip on the basis of thin slabs having a size of between 40–100 mm and a maximum width of 1,800 mm together with a continuous finishing train following an electric steel plant. Using this technology, at the present time about 15% of the hot strip production of about 300 million tpa is carried out. In this connection it was possible to lower the costs for producing the hot strip on the basis of an electric steel plant in conjunction with a thin slab plant by about 50% as far as the investment costs are concerned as well as the total manufacturing costs. In addition to further processing into strips and sheet metal, the process is used for producing long products, such as sections or wire.

In connection with the electric steel method, especially in the last years problems have occurred with respect to the increasing raw material prices for scrap and the low availability of scrap. In addition, components in the scrap lead to an increase of the accompanying elements copper (due to scrap copper wires) as well as of zinc and tin which, as is well known, lead to disadvantageous reductions of the quality in the material steel. Moreover, the production times required in the electric steel furnace with a sequence of tap to tap times of 50 to 70 minutes are too long in relation to the continuous casting plant.

SUMMARY OF THE INVENTION

Therefore, it is the primary object of the present invention to provide a method and a plant for manufacturing steel which eliminate the problems discussed above.

In accordance with the present invention, the electric steel furnace is charged with at most 70% by weight scrap, and with at most 60% by weight liquid pig iron obtained in a mini-blast furnace, and optionally with additional iron carriers, wherein the mini-blast furnace is operated for producing the pig iron with iron pellets and/or coarse or lump ore and coke as well as coal; and the melting process in the electric steel furnace is operated using electrical energy, and simultaneously using oxygen and injected coal.

The plant according to the present invention is composed of a mini-blast furnace and an electric steel furnace.

The invention is based on the concept of using at most 60% liquid pig iron and optionally additionally other iron carriers in an electric steel furnace, wherein simultaneously the proportion of scrap is minimized. The liquid pig iron is reduced in a mini-blast furnace with the use of iron pellets and/or coarse ore and coke as well as coal. The melting process in the electric steel furnace takes place with the use of electrical energy and the simultaneous use of oxygen and injected coal.

The mini-blast furnace advantageously has a capacity of 0.3 to 1.0 million tpa pig iron.

When charging the electric steel furnace with 30–50% pig iron, the capacity of the electric steel furnace adapts in an optimum manner to the maximum capacity of a conventional mini-mill for hot strip with 1.5 to at most 3 million tpa hot strip. In other words, when using about 30–50% by weight pig iron, 0.5–0.7 million tpa pig iron are used in the first stage of construction of a mini-mill and 0.9–1.5 million tpa pig iron are used in case of the full capacity of a mini-mill.

The mini-blast furnace is preferably charged 60–100% by weight with iron pellets, at most 40% by weight coarse ore and at most 400, preferably 250–200 kg, coke per ton of pig iron through the furnace throat. The blast furnace additionally has a coal injection device in the tuyeres through which the advantageously at most 250 kg coal per ton of pig iron are blown in. Also blown is hot air which is enriched with at most 10% by weight oxygen.

Since the structural height of the mini-blast furnace is smaller than that of a conventional blast furnace, the pressure load is also lower and the coke can be of average or lower quality. In addition, it is possible to operate the furnace without sinter, but with large quantities of coal.

In addition to the liquid pig iron, it is advantageous to use additional iron carriers with which the electric furnace is charged. These are preferably direct reduction materials (sponge iron) as well as solid pig iron in the form of pigs. By the addition of liquid pig iron and the additional variations of the iron carriers, the scrap portion can be reduced as desired in dependence on its price and can be replaced by the material which is most advantageous with respect to price and availability.

By reducing the scrap portion, the portion of the disadvantageous accompanying elements copper, zinc and tin in the steel also drops.

The reduction of the scrap portion and the use of liquid pig iron in the electric steel furnace in an amount of at most 60% by weight of the total quantity to be melted using chemical energy in the form of 4% by weight carbon lead, through the use of oxygen of preferably at most 65 $m^3$/t steel and a coal injection with the simultaneous use of the furnace electrodes, to a significantly reduced melting time. Consequently, the so-called tap to tap time, i.e., the time between charging and discharging of the furnace can be reduced to an interval of 25–45 minutes from previously 50–70 minutes which were required when the scrap portion is 100% by weight The proposed method serves to manufacture steel for the further processing into hot strip or long products, for example, rods, pipes, sections, wire. The shortened melting sequence in the electric steel furnace described above leads under particularly advantageous conditions to a doubling of the output of the steel mill, to an increase of the energy utilization from previously 50% to a maximum of 80% and to a high flexibility of the steel mill with respect of the process sequences of the thin slab casting and rolling mill.

In summary, the advantages of the method and plant according to the present invention are as follows:

increase of productivity;

increase of energy utilization of a maximum of 80% by reducing the tap to tap time to at least 25 minutes;

increase of the steel mill flexibility;

improvement of the product quality;

stabilization of the production costs by a control of the raw material procurement prices based on the high flexibility of the raw materials used in the electric steel furnace.

In the case of a required total pig iron production of at most 1.5 million tpa, it has additionally been found advantageous to construct two or three mini-blast furnaces each having a standard capacity of 0.5 to 0.7 million tpa instead of a conventional blast furnace, so that the advantages with respect to investment costs, raw material costs, ensuring the availability of liquid pig iron and the flexibility of the total system can be utilized.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

The single FIGURE of the drawing is a schematic illustration of the plant according to the present invention for manufacturing steel.

DESCRIPTION OF THE PREFERRED EMBODIMENTS

For manufacturing the pig iron used in the electric steel furnace, a mini-blast furnace 1 with a capacity of 0.3 to 1.0 million tons pig iron per year is charged with iron pellets 2, coarse ore 3 and coke 4. The blast furnace has a coal injection device 6 with a maximum blow capacity of 250 kg/t pig iron through the tuyeres 5.1. In addition to using hot air 5 produced by means of the wind heater 5.2, the device 6 is operated with a maximum addition of 10% by volume oxygen.

The pig iron 7 produced in the blast furnace 1 is conveyed by means of a transport system 9 to the electric furnace of the electric steel plant 12. The slag is denoted by reference number 8, and reference numbers 7.1 and 8.1 denote the tappings of pig iron and slag, respectively. In addition to the pig iron with a maximum portion of 60% by weight relative to the total melt amount, the furnace is additionally charged with scrap 10 in a maximum quantity of 70% by weight and optionally with direct reduction material 11 with a maximum portion of 30% by weight. Moreover, the use of pigs 11.1 with a maximum portion of 30% by weight is provided. Used as iron carriers are ores with a maximum portion of 30% by weight.

The electric steel furnace may either be an alternating current electric steel furnace or a direct current electric steel furnace. The electrodes for an alternating current furnace are denoted by 12.1 and the electrodes for a direct current furnace are denoted by 12.2.

The melting process is achieved by blowing in oxygen by means of an oxygen injection device 13 in an amount of at most 65 m$^3$/t steel, by injecting coal by means of a coal injection device 14, while simultaneously using electric current through the furnace electrodes 12.1 or 12.2.

The furnace tap is denoted by reference number 15. The steel is collected in suitable ladles 16 and is subjected to a secondary metallurgical treatment 17.

The melt obtained in this manner and subjected to secondary alloying is further processed either into hot strip 18 or long products 19. This is carried out either in a thin slab casting plant 18.1 with a temperature equalization furnace 18.2 and a subsequent continuous hot rolling plant 18.3. The strip manufactured in this manner is coiled in a last step 18.4.

Alternatively, the steel mill may produce melt for a mini-mill for long products 19 composed of a billet continuous casting plant 19.1, an equalization furnace 19.2 and a suitable rolling mill 19.3, wherein the products may be further processed, for example, in a wire train.

While specific embodiments of the invention have been shown and described in detail to illustrate the inventive principles, it will be understood that the invention may be embodied otherwise without departing from such principles.

I claim:

1. In a method of manufacturing steel by carrying out successive steps in a process sequence including a blast furnace and an electric steel furnace, the steps including producing pig iron in the blast furnace, transporting the liquid pig iron to the electric steel furnace, charging the electric steel furnace with at most 60% by weight liquid pig iron and with additional iron carriers, operating the melting process in the electric steel furnace, using electric energy and simultaneously using oxygen and injected coal, the improvement comprising operating the blast furnace as a mini-blast furnace having a capacity of 0.3 to 1.0 million tons pig iron per year with 60% by weight to 100% by weight iron pellets, at most 40% coarse iron or/and at most 400 kg coke per ton of pig iron charged through a throat of the mini-blast furnace and with at most 250 kg coal per ton of pig iron injected through tuyeres of the mini-blast furnace, and with hot air enriched with at most 10% by volume oxygen, charging the electric steel furnace with the pig iron produced in the mini-blast furnace and with additional iron carriers including at most 70 percent scrap, and further introducing into the electric steel furnace at most 65 m$^3$ O$_2$/t and fine coal.

2. The method according to claim 1, comprising further processing steel melt from the electric steel furnace in a subsequent thin slab casting plant and a continuous hot-rolling mill into strips and sheet steel.

3. The method according to claim 1, comprising further processing steel melt from the electric steel furnace in a subsequent billet continuous casting plant and a long product rolling mill into long products.

4. The method according to claim 1, wherein the electric steel furnace is charged with at most 30% by weight solid pig iron.

5. The method according to claim 1, further comprising charging the electric steel furnace with an additional iron carrier of at most 30% by weight direct reduction in material.

6. The method according to claim 5, wherein the iron carrier is partially introduced in the form of ore.

* * * * *